(12) United States Patent
Matsubara

(10) Patent No.: US 7,719,150 B2
(45) Date of Patent: May 18, 2010

(54) VIBRATION-GENERATING STEPPING MOTOR

(75) Inventor: Masaaki Matsubara, Yonago (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 247 days.

(21) Appl. No.: 12/055,902

(22) Filed: Mar. 26, 2008

(65) Prior Publication Data
US 2008/0278012 A1 Nov. 13, 2008

(30) Foreign Application Priority Data
May 11, 2007 (JP) ............... 2007-126668

(51) Int. Cl.
*H02K 7/065* (2006.01)
*H02K 37/12* (2006.01)
(52) U.S. Cl. ............ 310/90; 310/49.11; 310/49.15; 310/81
(58) Field of Classification Search ........... 310/49.01, 310/49.11, 49.15–49.17, 81, 90, 257
See application file for complete search history.

(56) References Cited

U.S. PATENT DOCUMENTS

| RE28,075 E * | 7/1974 | Kavanaugh ......... 310/49.17 |
| 5,808,390 A * | 9/1998 | Miyazawa et al. ....... 310/194 |
| 6,326,711 B1 * | 12/2001 | Yamaguchi et al. ........ 310/81 |
| 7,271,516 B2 * | 9/2007 | Matsubara et al. ......... 310/81 |
| 2005/0006960 A1 | 1/2005 | Matsushita et al. |
| 2005/0146233 A1 | 7/2005 | Miyawaki |
| 2006/0049705 A1 * | 3/2006 | Matsubara et al. ......... 310/81 |
| 2006/0186742 A1 | 8/2006 | Miyawaki |
| 2006/0267429 A1 | 11/2006 | Archer et al. |

FOREIGN PATENT DOCUMENTS

| JP | 2002-309303 A | 10/2002 |
| JP | 2003-156044 A | 5/2003 |
| JP | 2004-215397 A | 7/2004 |
| JP | 2006-074949 A * | 3/2006 |

* cited by examiner

*Primary Examiner*—Burton Mullins
(74) *Attorney, Agent, or Firm*—Brinks Hofer Gilson & Lione

(57) ABSTRACT

The present invention provides a vibration-generating stepping motor including: two stator yokes; a bearing that magnetically couples the two stator yokes; a rotor frame that rotates on a circumference of the stator yokes; and an eccentric weight that shifts a gravity center of the rotor frame from a rotation center of the rotor frame.

5 Claims, 4 Drawing Sheets

VIBRATION-GENERATING STEPPING MOTOR

RELATED APPLICATIONS

This application claims priority under 35 U.S.C. §119 to Japanese Patent Application No. JP2007-126668 filed May 11, 2007, the entire content of which is hereby incorporated by reference.

BACKGROUND OF THE INVENTION

1. Field of the Invention

The present invention relates to a vibration-generating stepping motor which is equipped with a bearing functioning as a magnetic circuit, so that miniaturization of the motor can be performed, the strength of the bearing can be maintained, and strong magnetomotive force, that is, desired rotation speed can be produced.

2. Description of Related Art

In recent years, in mobile devices (for example, mobile phones, personal handyphone systems (PHSs), and personal digital assistants (PDAs)), vibration-generating motors are used for call-reception informing functions or for providing vibration sensations. An inexpensive DC (Direct Current) motor with a brush may be used as a vibration-generating motor. However, the service life of the DC motor is short. Since time periods for starting and stopping of the motor are long, it is difficult to control the DC motor. Thus, a stepping motor, which has a relatively long service life, has a simple drive circuit, can be easily controlled, and is advantageous as a vibration-generating motor.

Japanese Unexamined Patent Application Laid-open No. 2004-215397 has proposed a technique for a vibration-generating motor. This vibration-generating motor is an inner rotor type of PM (Permanent Magnet) stepping motor which is equipped with two rotor magnets. The rotor magnets are provided as a first magnet and a second magnet at different positions with respect to a shaft in an axial direction. An eccentric weight, which shifts a gravity center of a rotor, is provided between the two rotor magnets. This vibration-generating motor is equipped with two bearings in the same manner as the two rotor magnets, so that a biased load received by the bearing can be reduced, and the service life of the bearing can be extended.

The sizes of mobile devices (for example, Mobile phones, PHSs, and PDAs) are progressively reduced, and vibration-generating motors provided in the above devices are made more compact and thinner.

SUMMARY OF THE INVENTION

The present invention has been made in light of the above problems, and it is an object of the present invention to provide a vibration-generating stepping motor which can be made more compact, can maintain the strength of a bearing, and can produce strong magnetomotive force, that is, desired rotation speed.

According to a first aspect of the present invention, a vibration-generating stepping motor includes: two stator yokes; a bearing that magnetically couples the two stator yokes; a rotor frame that rotates on a circumference of the stator yokes; and an eccentric weight that shifts a gravity center of the rotor frame from a rotation center of the rotor frame.

In the aspect of the present invention, since the vibration-generating stepping motor is equipped with the bearing functioning as a part of a magnetic circuit, a core which magnetically couples the two stator yokes can be removed. Thus, the number of components and the number of steps required for assembly can be reduced (that is, miniaturization of the motor can be realized), so that the production cost can be reduced. The power input to the motor is changed from high to low in accordance with the miniaturization of the motor, and magnetic saturation in the magnetic circuit due to the miniaturization is difficult to occur. Therefore, even when a core is removed, strong magnetomotive force, that is, desired rotation speed can be obtained at a rated input.

A space formed by removal of the core can be used as a winding space of the coil or the bearing. When the space is employed as a winding space of the coil, the number of turns of windings is increased, so that the magnetomotive force generated at an input lower than a rated input is equal to that of a motor having a core. That is, the rotation speed can be produced sufficiently. In this case, the desired rotation speed is about 9000 rpm. When the motor is rotated at a speed of about 9000 rpm, which corresponds to vibration amount of 1 G, the vibration provides a good body sensitivity. On the other hand, when the space is employed as a bearing space, the circumferential thickness of the bearing is increased, so that durability against a biased load is improved. Since the eccentric weight is provided to the rotor frame (that is, an outer rotor) rotating at the circumference of the stator yokes, the motor can effectively generate vibrations larger than an inner rotor type of motor.

According to a second aspect of the present invention, the bearing is an oil-impregnated sintered bearing made of a sintered alloy having pores in which oil is impregnated. The oil-impregnated sintered alloy may be a porous sintered alloy having many pores (which function as paths through which air may pass) and oil is impregnated in the pores. Thus, in the bearing, the oil impregnated in the pores is exuded by frictional heat generated by rotation of a shaft, and an oil film is formed between the bearing and the shaft. Therefore, maintenance (for example, oil supply) is not required. Since the bearing is porous, the durability against a biased load can be improved, and shaft loss can be reduced.

According to a third aspect of the present invention, the bearing is an oil-impregnated sintered bearing including: 99 mass % or more of Fe. In this feature, the bearing can function as a part of a magnetic circuit, and the influence by impacts can be small. The durability against a biased load can be improved, and the shaft loss can be reduced.

According to a fourth aspect of the present invention, the bearing is an oil-impregnated sintered bearing including Fe and Si as a main composition, and the bearing includes; 3 to 4 mass % of Si. In this feature, the permeability and the magnetic saturation of the bearing can be relatively high, and the iron loss of the bearing can be also small. Thus, in the vibration-generating stepping motor having no core, magnetomotive force can be improved, and the desired rotation speed can be produced. Since the material of the bearing is relatively inexpensive, the production cost can be reduced.

According to a fifth aspect of the present invention, the bearing is an oil-impregnated sintered bearing including Fe, Si, and Al as a main composition. In this feature, the permeability and the magnetic saturation of the bearing may be relatively high, the iron loss of the bearing may be also small, and the wear resistance of the bearing may be good. Thus, in the vibration-generating stepping motor having no core, magnetomotive force can be improved, the desired rotation speed can be produced, and the durability against a biased load can be improved.

According to the vibration-generating stepping motor of the present invention, miniaturization can be realized (that is, the number of components and the number of steps required for assembly can be reduced), the strength of the bearing can be maintained, and the strong magnetomotive force, that is, the desired rotation speed can be produced.

BRIEF DESCRIPTION OF THE DRAWINGS

The above object and other advantages of the present invention will become more apparent by describing in detail the preferred embodiment of the present invention with reference to the attached drawings in which;

FIG. 1A is a cross sectional view of the motor taken along line A-A in FIG. 1B, and FIG. 1B is a cross sectional view of the motor taken along line B-B in FIG. 1A;

DETAILED DESCRIPTION OF THE INVENTION

Preferred embodiments of the present invention will be described hereinafter with reference to the drawings.

1. First Embodiment

In a first embodiment, one example of a vibration-generating stepping motor will be described hereinafter. The vibration-generating stepping motor has no core and it is equipped with a bearing which functions as a part of a magnetic circuit.

1.1 Configuration of Vibration-Generating Stepping Motor

Figure 1A:
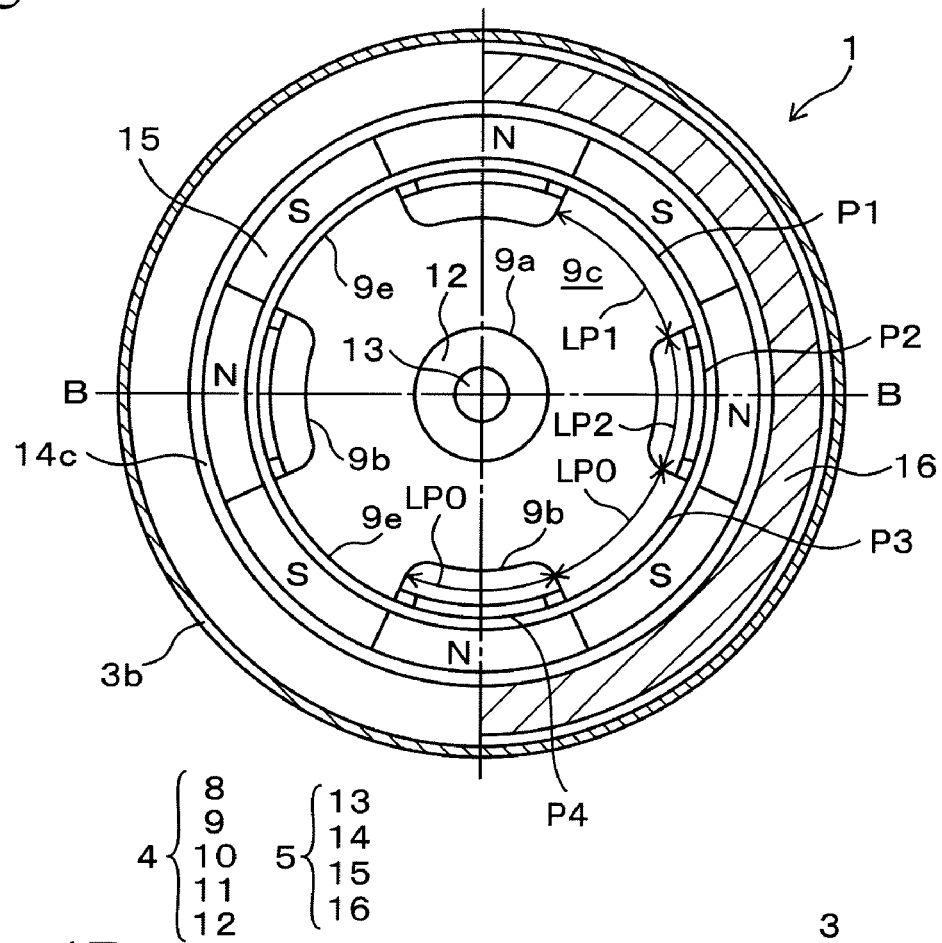
FIGS. 1A and 1B show a configuration of a vibration-generating stepping motor according to a first embodiment of the present invention.
Figure 1B:
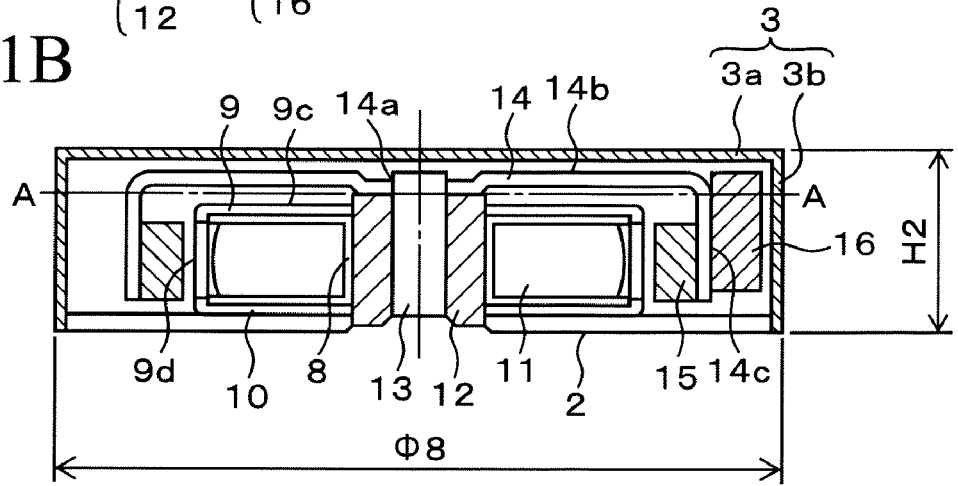
Figure 2:
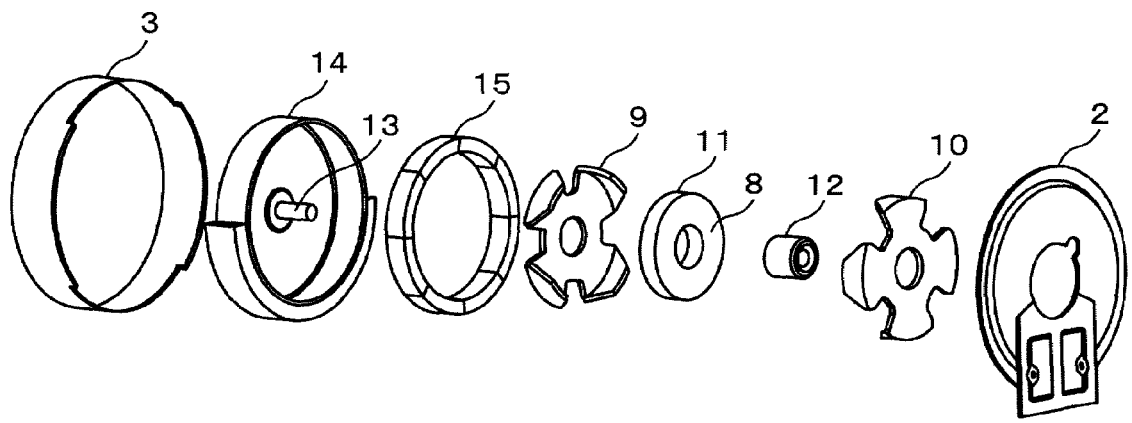
FIG. 2 is an exploded view showing the vibration-generating stepping motor of the first embodiment.

FIGS. 1A, 1B and 2 show a configuration of a vibration-generating stepping motor 1. FIG. 1A is a cross sectional view of the motor 1 taken along line A-A in FIG. 1B, and FIG. 1B is a cross sectional view of the motor 1 taken along line B-B in FIG. 1A. FIG. 2 is an exploded view of the motor 1. The vibration-generating stepping motor 1 shown in FIGS. 1A and 1B is an outer rotor-type of motor, and is comprised of a bottom plate 2, a cover 3, a stator 4, and a rotor 5. The vibration-generating stepping motor 1 is a compact eccentric motor having no core. For example, the vibration-generating stepping motor 1 has an outer diameter of 8 mm and a height of 2 mm.

The bottom plate 2 is made of a metal material. On an upper surface of the bottom plate 2, a second stator yoke 10 of the stator 4 and a bearing 12 served as a third stator yoke are fixed. The bottom plate 2 has a substrate and an opening (not shown in the Figures). The substrate has a power feeding line connected to a coil, and is connected to a control circuit, a power supply, and the like, which are outside. A projection, which is formed on an end surface of a cylindrical portion 3b of the cover 3, is fitted in the opening, and is soldered or welded from a rear surface of the bottom plate 2. In the first embodiment, the bottom plate 2 has an outer diameter of 8 mm.

The cover 3 is made of a metal material (for example, SUS303 (stainless steel)). The cover 3 has a disc portion 3a and the cylindrical portion 3b, and is cup-shaped and approximately C-shaped in cross section. Several projections (not shown in the Figures) are formed on an end surface of the cylindrical portion 3b so as to be bonded and fixed to the bottom plate 2. The cover 3 has an outer diameter of 8 mm and a height of 2 mm.

The stator 4 has an coil bobbin 8, a first stator yoke 9, the second stator yoke 10, a stator coil 11, and the bearing 12. The first stator yoke 9 is made of a magnetic material, and has a cup-shape having an opening 9a and cutouts 9b formed at a center portion thereof. The opening 9a is formed at a center portion of a disc portion 9c, and a cylindrical portion 9d is connected around the disc portion 9c. The cutouts 9b are provided at four portions which are equidistant from each other, and they are approximately U-shaped from the cylindrical portion 9d to the disc portion 9c. Pole teeth 9e are formed between the cutouts 9b. The approximately U-shaped cutout 9b is determined based on the shapes of the pole teeth 9e. Each of the first stator yoke 9 and the second stator yoke 10 has a plate thickness of 0.15 mm.

The second stator yoke 10 is made of the same material as the first stator yoke 9, and has the same shape as the first stator yoke 9. The first stator yoke 9 and the second stator yoke 10 are positioned by the bearing 12 so that the comb-like pole teeth of the first stator yoke 9 and the comb-like pole teeth of the second stator yoke 10 are interdigitated with each other. The coil bobbin 8 having the stator coil 11 wound therearound is provided between the first stator yoke 9 and the second stator yoke 10. The first stator yoke 9, the second stator yoke 10, and the bearing 12 which serves as the third stator yoke are disposed so as to cover the area which surrounds the annular stator coil 11.

The magnetic field generated by the stator coil 11 passes through the pole tooth of the first stator yoke 9, the pole tooth of the second stator yoke 10, the bearing 12, the pole tooth of the first stator yoke 9, etc., in turn. Thus, the pole teeth of the first stator yoke 9 function as north poles, and the pole teeth of the second stator yoke 10 function as south poles. In this manner, since the stator yokes, which has magnetic poles, that is, a north pole, a south pole, a north pole, etc., in turn, face a ring magnet 15 described below in a radial direction, the stator yokes and the ring magnet 15 repel or attract each other, so that the rotor 5 rotates in a predetermined direction. Since the direction of drive current supplied to the stator coil 11 is changed when the stator yokes and the ring magnet 15 attract each other, the direction of the magnetic field generated by the stator coil 11 is changed such that the magnetic field passes through the pole tooth of the second stator yoke 10, the pole tooth of the first stator yoke 9, the bearing, the pole tooth of the second stator yoke 10, etc., in turn. Thus, the pole teeth of the first stator yoke 9 function as south poles, and the pole teeth of the second stator yoke 10 function as north poles. Hereinafter, the same operations are repeated, and the rotor 5 is continuously rotated.

In one pair of pole teeth P1 and P2, which are proximate to each other, of the comb-like teeth of the first stator yoke 9 and the second stator yoke 10, rotational direction lengths LP1 and LP2 are unequal. On the other hand, in other pole teeth (for example, pole teeth P3 and P4), rotational direction lengths LP0 and LP0 are equal. In this feature, at next start of running of the motor 1 after the supply of the drive current to the stator coil 11 is stopped, the rotational direction of the rotor becomes the same direction. FIG. 1A shows the stop condition of the motor 1. In this condition, when the rotor 5 rotates in a clockwise direction, the direction of the drive current is adjusted so that the pole tooth P1 of the first stator yoke 9 functions as the south pole. Then, the pole tooth P1 functioning as the south pole is attracted to the north pole of the ring magnet 15. Thus, the rotor 5 rotates in a clockwise direction.

The coil bobbin 8 is made of a resin, and holds the stator coil 11 and electrically insulates the stator coil 11 from the members forming a magnetic circuit. The members forming a magnetic circuit are the first stator yoke 9, the second stator yoke 10, and the bearing 12 which serves as a third stator yoke. The coil bobbin 8 is approximately C-shaped in cross section, and it is annular in one plane (not shown in the Figures).

The stator coil 11 is comprised of an any kind of wire, and is formed as an annular coil such that the wire is wound around the coil bobbin 8 so as to have a predetermined number of turns of windings, a predetermined number of winding steps, and a predetermined tension. A coil terminal of the stator coil 11 is soldered to the substrate of the bottom plate 2. Since the vibration-generating stepping motor 1 is driven by the annular stator coil 11 which is a single phase type, the motor 1 can be made more compact and thinner than an axial motor which is a multi phase type.

The bearing 12 is made of an oil-impregnated sintered alloy including 99 mass % or more of iron (Fe). The oil-impregnated sintered alloy has many pores (which function as paths through which air may pass) and oil is impregnated in the pores. Thus, in the bearing 12, the oil impregnated in the pores is exuded by frictional heat generated by rotation of a shaft 13, and an oil film is formed between the bearing 12 and the shaft 13. Therefore, maintenance (for example, oil supply) is not required. Since the bearing 12 is porous, the durability against a biased load due to an eccentric weight is improved, and shaft loss is reduced. The porosity of the bearing 12 is set such that an appropriate amount of lubricant oil is supplied between the inner peripheral surface of the bearing 12 and the shaft 13. In this case, the supply of oil is unnecessary in general but a reservoir for the supply of oil may be provided. In this feature, the service life of the bearing 12 can be extended. The bearing 12 has a density of about 6.0 g/cm$^3$.

The bearing 12 serves as the third stator yoke which magnetically couples the two stator yokes (the first stator yoke 9 and the second stator yoke 10) and which functions as the alternative to a core forming a part of a magnetic circuit. That is, the vibration-generating stepping motor 1 has no core. As a result, the number of components and the number of steps required for assembly can be reduced, so that the production cost can be reduced. According to findings of the inventor, the power supply to the motor is changed from a high input to a low input in accordance with the miniaturization of the motor, and magnetic saturation due to the miniaturization is difficult to occur. Therefore, even when a core is removed, magnetomotive force, that is, desired rotation speed can be produced at a rated input.

A space formed by removal of the core can be used as a winding space of the stator coil or a bearing space. When the shape of the motor has an outer diameter of 8 mm and a height of 2 mm ($\phi$8–H2), in general, the thickness of the core is about 0.1 to 0.3 mm. In this case, the number of winding steps of the stator coil 11 (having a wire diameter of about 40 to 50 μm) is increased by two or three. For example, when the number of winding steps is about 20, the number of turns is increased by 10 to 15%. In this manner, when a space formed by removal of the core is used as a winding space of the coil, the number of windings is increased, so that the magnetomotive force generated at an input lower than a rated input is equal to that of a motor having a core. That is, the rotation speed can be produced sufficiently. On the other hand, when a space formed by removal of the core is employed as a bearing space, the circumferential thickness of the bearing is increased, so that durability against a biased load is improved.

The rotor 5 has the shaft 13, a rotor frame 14, the ring magnet 15, and an eccentric weight 16. The shaft 13 is a cylindrical rod, and an end portion of the shaft 13 is connected to the rotor frame 14. The shaft 13 has an outer diameter of 0.6 mm. The shaft 13 is inserted and supported in the bearing 12. The rotor frame 14 is made of a metal material (for example, iron (Fe)). The rotor frame 14 has a disc portion 14b having an opening 14 has a center portion thereof and a cylindrical portion 14c connected to the circumferences of the disc portion 14b. The rotor frame 14 is cup-shaped. The shaft 13 is fitted and fixed in the opening 14a of the rotor frame 14. In this case, the rotor frame 14 is spaced from the first stator yoke 9, and is supported by a spacer stacked on the bearing 12. The ring magnet 15 is secured to the inner side surface of the cylindrical portion 14c of the rotor frame 14.

The ring magnet 15 is comprised of appropriately selected magnetic material (for example, neodymium (Nd), iron (Fe), boron (B), samarium (Sm), or cobalt (Co)). The ring magnet 15 is formed such that a cylindrical permanent magnet is multipolarly magnetized, and has 4 pairs of magnetic poles. The ring magnet 15 is secured to the inner side surface of the rotor frame 14, and faces the first stator yoke 9 and the second stator yoke 10 in the radial direction. Thus, magnetic force providing for the rotation is relatively strong, and the desired rotation speed can be produced at a lower input.

The eccentric weight 16 is comprised of a high specific gravity metal material which is, for example, iron (Fe), copper (Cu), lead (Pb), or tungsten (W), or a sintered alloy including any of them as a main composition. The eccentric weight 16 has a partial ring-shape having a predetermined angle range, and the center angle of the eccentric weight 16 can be appropriately determined based on the specific gravity of the material employed or the like. In this example, the center angle is 180 degrees. The eccentric weight 16 having a partial ring-shape is joined by welding or the like to a circumferential surface of the rotor frame 14. Thus, the position of the eccentric weight 16 is relatively remote from the rotation center, and vibrations are produced effectively.

In a vibration mechanism of the rotor frame 14 having the eccentric weight 16, the vibration amount of the eccentric weight 16 is expressed as "mrw$^2$". In the expression, m, r and w are the mass (kg), the distance (m) from the rotation center to the gravity center of the eccentric weight 16 and the rotation speed (rpm), respectively. In general, body sensitivity produced at a vibration level of about 1 G is desirable, and the rotation speed in this case is about 9000 rpm. Thus, an outer rotor type of motor having a greater length from the center to the eccentric weight 16 is more advantageous than an inner rotor type of motor. Since the eccentric weight 16 can be formed at a predetermined position on the circumference of the rotor frame 14, the manufacture can be facilitated.

1.2 Drive Circuit

Figure 3:
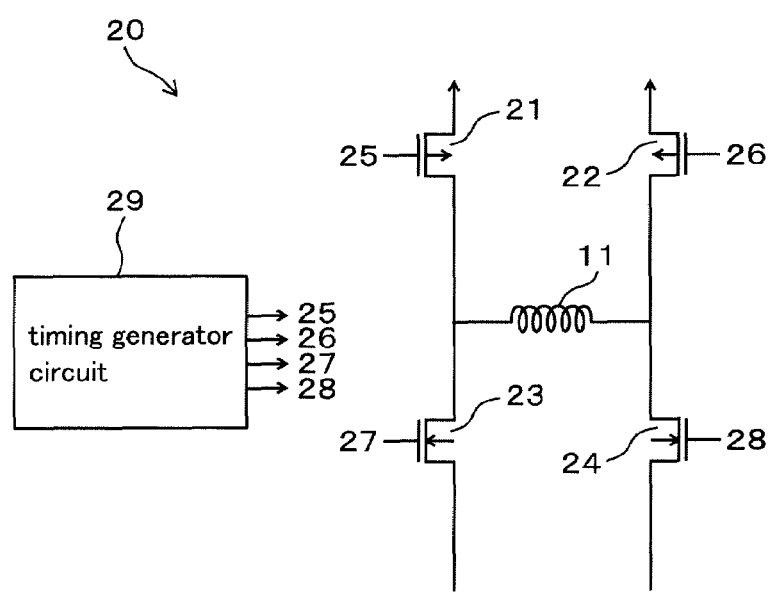
FIG. 3 is a block diagram showing a drive circuit of the vibration-generating stepping motor of the first embodiment.

FIG. 3 is a block diagram showing one example of a drive circuit of the vibration-generating stepping motor 1. A drive circuit 20 has p-channel Metal-Oxide-Semiconductor Field-Effect-Transistors (p-channel MOSFETs) 25 and 26, n-type MOSFETs 27 and 28, and a timing generator circuit 29. The drive circuit 20 is connected to the annular stator coil 11, which is a single phase type. The drive circuit 20 supplies a current to the stator coil 11 to change the current direction alternately.

The p-channel MOSFETs 25, 26 and the n-channel MOSFETs 27, 28 are switching devices, and they change the direction of the current supplied to the stator coil 1. The timing generator circuit 29 is an integrated circuit (IC) which is a microcomputer or the like, and outputs a drive timing signal to the p-channel MOSFETs 25, 26 and the n-channel MOSFETs 27, 28. Instead of the MOSFETs, other switching devices may be employed.

The drive timing signal is generated by the timing generator circuit 29, and is supplied to the p-channel MOSFETs 25, 26 and the n-channel MOSFETs 27, 28. At an a-pulse duration, the p-channel MOSFET 25 and the n-channel MOSFET 28 are ON, and the current is supplied to the stator coil 11 in a predetermined direction. On the other hand, at a b-pulse duration, the p-channel MOSFET 26 and the n-channel MOSFET 27 are ON, and the current is supplied to the stator coil 11 in the opposite direction. Hereinafter, the same control is repeated.

The timing generator circuit 29 controls the rotation speed of the vibration-generating stepping motor 1 by pulse width modulation (PWM). That is, the timing generator circuit 29 gradually decreases the pulse width during acceleration of the motor 1, so that the switching time of the direction of the current supplied to the stator coil 11 is gradually made shorter. On the other hand, the timing generator circuit 29 maintains the pulse width to be constant during the constant speed of the motor 1, so that the switching time of the direction of the current supplied to the stator coil 11 is maintained so as to have a constant interval. The timing generator circuit 29 gradually increases pulse width during deceleration of the motor 1, so that the switching time of the direction of the current supplied to the stator coil 11 is gradually longer.

In this manner, the rotation speed of the vibration-generating stepping motor 1 is controlled in the acceleration condition, the constant speed condition, and the deceleration condition. In the acceleration condition, the rise time to the constant speed is set to be, for example, 0.3 to 0.5 second. In the constant speed condition, the motor is rotated at a speed of, for example, 9000 rpm which is providing a good body sensitivity. In this case, a biased load of about 1 G is applied to the bearing 12. The time period of speed deceleration is desirably as short as possible.

1.3 Comparative Example of First Embodiment

Figure 4A:
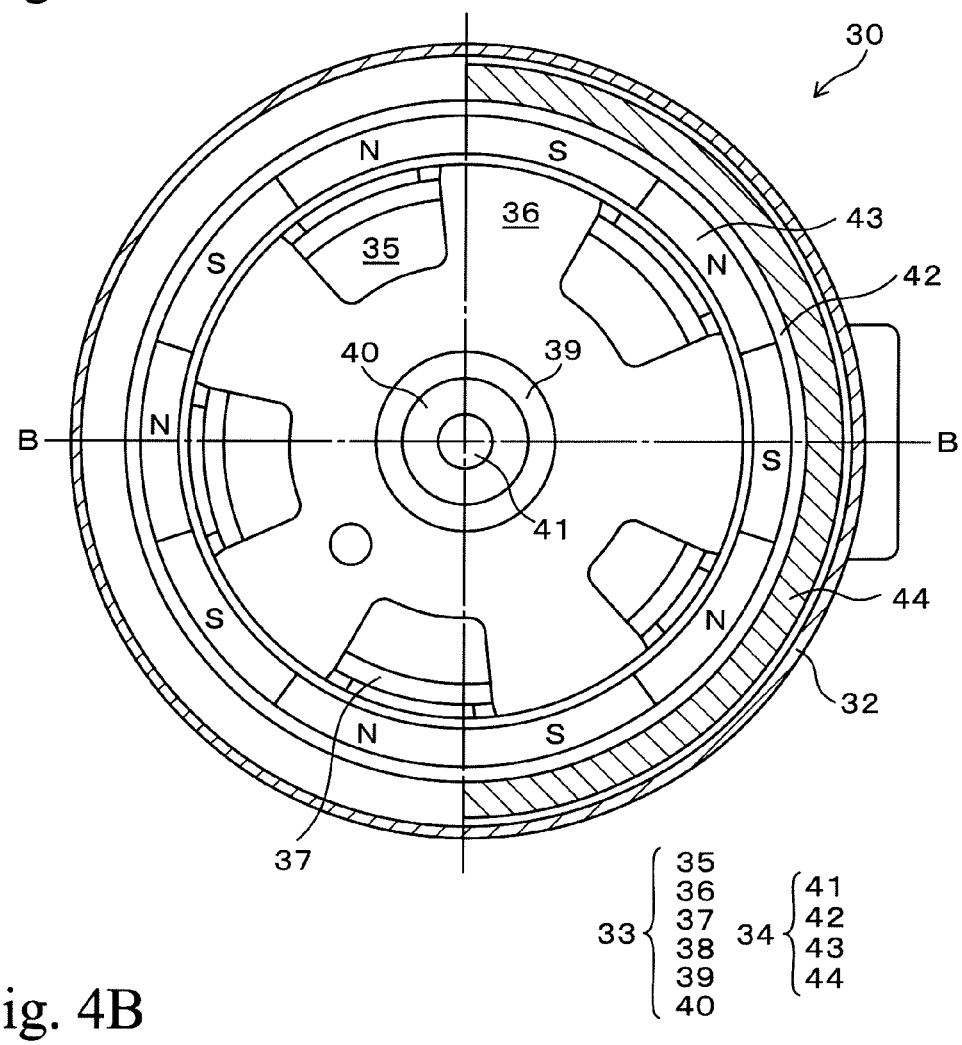
FIGS. 4A and 4B show a configuration of a comparative example of a vibration-generating stepping motor in the first embodiment.
Figure 4B:
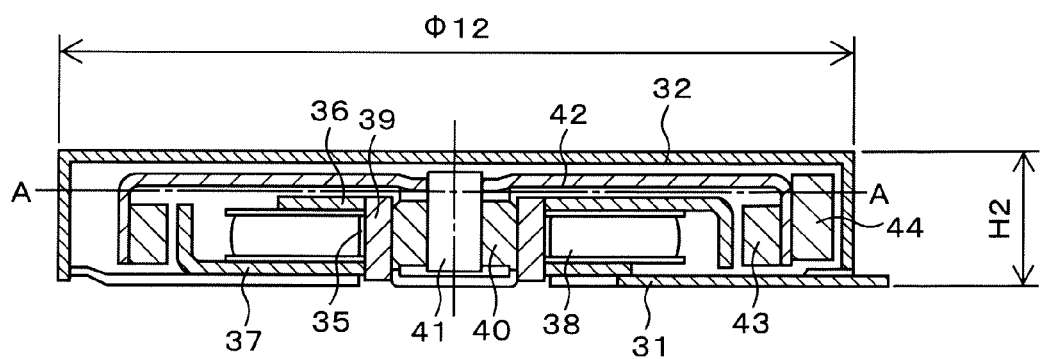

FIGS. 4A and 4B shows a configuration of a comparative example of a vibration-generating stepping motor in the first embodiment. The configuration of the comparative example will be described hereinafter. A vibration-generating stepping motor 30 of the comparative example is equipped with a bottom plate 31, a cover 32, a stator 33, and a rotor 34. The vibration-generating stepping motor 30 has a core, and has an outer diameter of 12 mm and a height of 2 mm. That is, the vibration-generating stepping motor 30 has the same height of the vibration-generating stepping motor 1, and is different from the vibration-generating stepping motor 1 in an outer diameter and in whether a core is provided or not.

The stator 33 has a coil bobbin 35, a first stator yoke 36, a second stator yoke 37, a stator coil 38, a core 39, and a bearing 40. The stator coil 38 is wound around the coil bobbin 35. The rotor 34 has a shaft 41, a rotor frame 42, a ring magnet 43, and an eccentric weight 44. The component members other than the core 39 are different from those of the vibration-generating stepping motor 1 only in a radial diameter size, and they have the same materials and shapes as those of the vibration-generating stepping motor 1.

The core 39 is made of a magnetic material (for example, an iron (Fe)-based sintered material). The core 39 is disposed between the first stator yoke 36 and the second stator yoke 37 and the bearing 40, and forms a part of a magnetic circuit together with the first stator yoke 36 and the second stator yoke 37. The core 39 has a density of about 6.6 g/cm$^3$.

Table 1 shows one design example of the vibration-generating stepping motor 1 of the example and the vibration-generating stepping motor 30 of the comparative example.

TABLE 1

| | Motor Shape | Core | Bearing | Shaft | Yoke |
|---|---|---|---|---|---|
| Example | φ8-H2 | No Core | φ1.4-φ0.6 t0.4 | φ0.6 | t0.15 |
| Comparative Example | φ12-H2 | φ2.7-φ1.9 t0.4 | φ1.9-φ0.8 t0.4 | φ0.8 | t0.2 |

Figure 5:
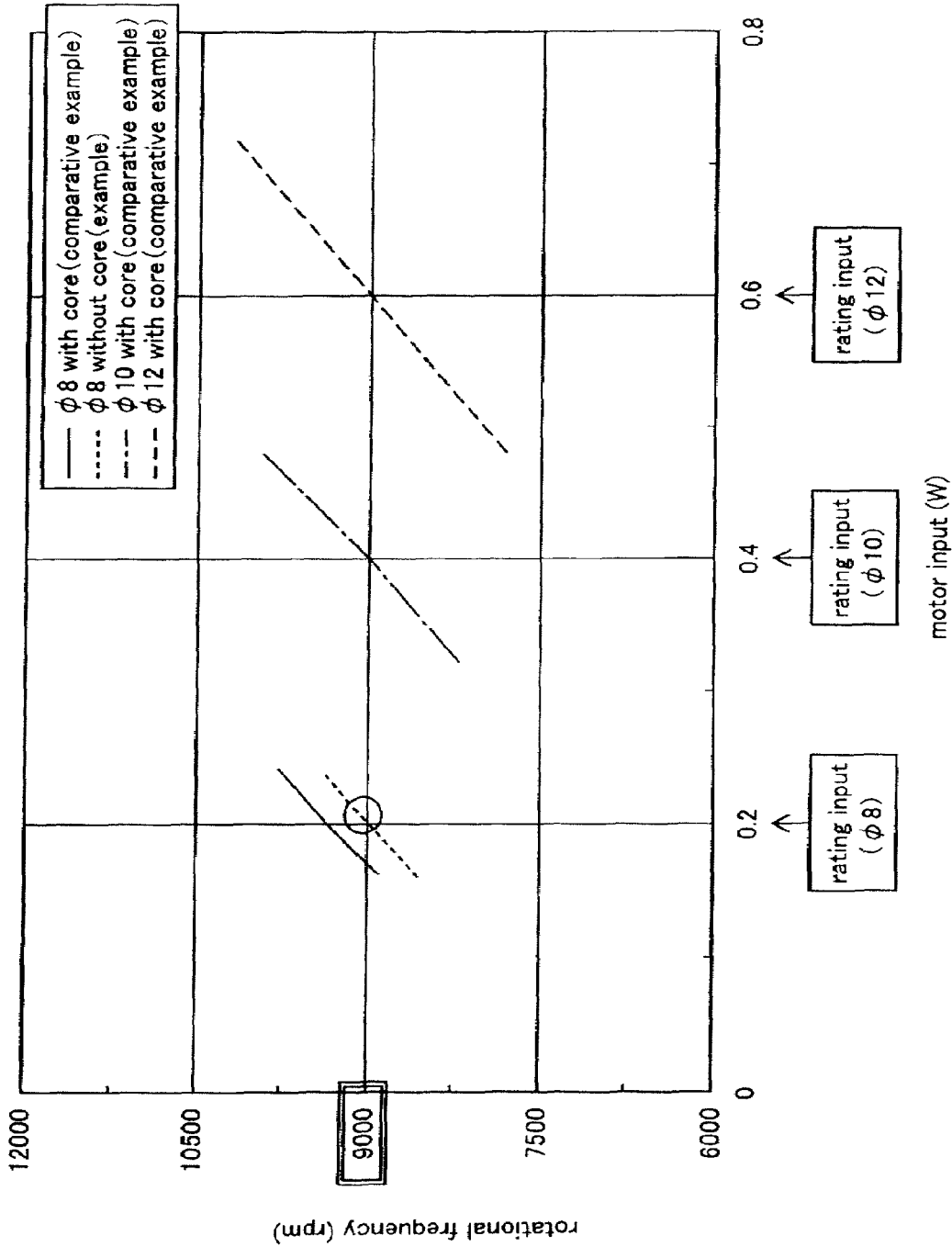
FIG. 5 is a graph showing the relationships between the motor input and the rotation speed in the embodiment and the comparative example.

Hereinafter, the differences between an example and comparative examples will be described with reference to FIG. 5. FIG. 5 is a graph showing the relationships between the motor input and the rotation speed in the embodiment and the comparative example. An example of the vibration-generating stepping motor 1 shown in FIG. 5 is a motor which has no core and has an outer diameter (φ) of 8 mm. Three comparative examples are a motor which has a core and has an outer diameter (φ) of 8 mm, a motor which has a core and has an outer diameter (φ) of 10 mm, and a motor which has a core and has an outer diameter (φ) of 12 mm. The comparative examples have the same configuration as the vibration-generating stepping motor 30, and they are different from each other in an outer diameter and a core. In the embodiment and the three comparative examples, electrical power (motor input) supplied to the coil was varied from a minimum rated input to a maximum rated input, and the rotation speed of each motor of the embodiment and the comparative examples was measured.

The embodiment and the comparative examples were set to produce the desired rotation speed (9000 rpm) at a rated input. However, as shown by each characteristic curve in FIG. 5, it was found that the motor having a core and an outer diameter of 8 mm, which is the minimum, could produce the desired rotation speed (9000 rpm) at an input lower than a rated input (0.2 W). This may be because the supplied electric power is varied from a high input to a low input in accordance with a miniaturization of a motor and magnetic saturation is difficult to occur.

On the other hand, the motor of the embodiment which has no core and an outer diameter of 8 mm could produce the desired rotation speed (9000 rpm) at a rated input (0.2 W) which, however, was higher than that in the comparative example which has a core and an outer diameter of 8 mm, regardless of having no core. When a space formed by removal of a core in the vibration-generating stepping motor 1 is employed as a winding space of a coil, the magnetomotive force produced as a stator even at a low input is approximately equal to that of the motor which has a core and an outer diameter of 8 mm. Thus, the motor of the embodiment which has no core and an outer diameter of 8 mm could produce the desired rotation speed at a low input. In addition to this effect, in the motor of the embodiment which has no core and an outer diameter of 8 mm, the number of components and the number of the steps required for assembly can also be reduced, so that the miniaturization and the production cost of the motor can be performed.

2. Second Embodiment

In the second embodiment, other examples of the bearing functioning as a part of a magnetic circuit will be described. The vibration-generating stepping motor 1 is equipped with the bearing 12 made of each material (1) to (4) described below. The configuration of the vibration-generating stepping motor 1 has the same configuration as those in FIGS. 1A, 1B, and 2.

The material (1) is an Fe—Si based oil-impregnated sintered alloy in which small amount of Si (silicon) is added to Fe. For example, this oil-impregnated sintered alloy includes 3 to 4 mass % of Si. Since silicon steel has a relatively high permeability and is inexpensive, the production cost of the bearing functioning as a part of a magnetic circuit can be reduced.

The material (2) is an Fe—Ni based oil-impregnated sintered alloy including Fe and Ni (nickel) as a main composition. A content of Ni in this sintered alloy is appropriately adjusted in accordance with the durability against an impact and a biased load and in accordance with a desired rotation speed. For example, this oil-impregnated sintered alloy includes 36 to 78 mass % of Ni. When small amount of Mo (molybdenum) which is paramagnetic is added to Fe and Ni, the permeability can be further improved.

The material (3) is an Fe—Si—Al based oil-impregnated sintered alloy including Fe, Si, and Al (aluminum) as a main composition. For example, a content of Fe, Si and Al in this sintered alloy is 9.5 mass %, 5.5 mass %, and 8.5 mass %, respectively. In this feature, the permeability and the magnetic saturation of the bearing 12 are relatively high, and the iron loss of the bearing 12 is also small, so that wear resistance of the bearing 12 is good.

The material (4) is an oil-impregnated sintered alloy in which Fe and Co are included at a ratio of 1:1. In this sintered alloy, the permeability and the magnetic saturation of the bearing 12 are relatively very high.

In these features, in the vibration-generating stepping motor 1 having no core, since sufficient magnetomotive force can be produced even at a low input of electric power supplied to the stator coil 11, desired rotation speed (9000 rpm) can be produced. That is, these features are desirably for the bearing 12 functioning as a part of a magnetic circuit.

INDUSTRIAL APPLICABILITY

The present invention can be applied to vibration-generating stepping motors, which can be made more compact, can maintain the strength of a bearing, and can produce strong magnetomotive force, that is, desired rotation speed. The present invention can be applied to mobile phones, PHSs, PDAs, and the like, which use the above motor.

What is claimed is:

1. A vibration-generating stepping motor comprising:
   two stator yokes;
   a bearing that magnetically couples said two stator yokes;
   a rotor frame that rotates on a circumference of said stator yokes; and
   an eccentric weight that shifts a gravity center of said rotor frame from a rotation center of said rotor frame.

2. A vibration-generating stepping motor according to claim 1, wherein
   said bearing is an oil-impregnated sintered bearing comprising of a sintered alloy having pores in which oil is impregnated.

3. A vibration-generating stepping motor according to claim 1, wherein
   said bearing is an oil-impregnated sintered bearing including: 99 mass % or more of Fe.

4. A vibration-generating stepping motor according to claim 1, wherein
   said bearing is an oil-impregnated sintered bearing including Fe and Si as a main composition, and said bearing includes 3 to 4 mass % of Si.

5. A vibration-generating stepping motor according to claim 1, wherein
   said bearing is an oil-impregnated sintered bearing including Fe, Si, and Al as a main composition.

* * * * *